A. M. LAYCOCK.
AUTOMOBILE SPRING.
APPLICATION FILED JAN. 20, 1916.
1,182,181.
Patented May 9, 1916.
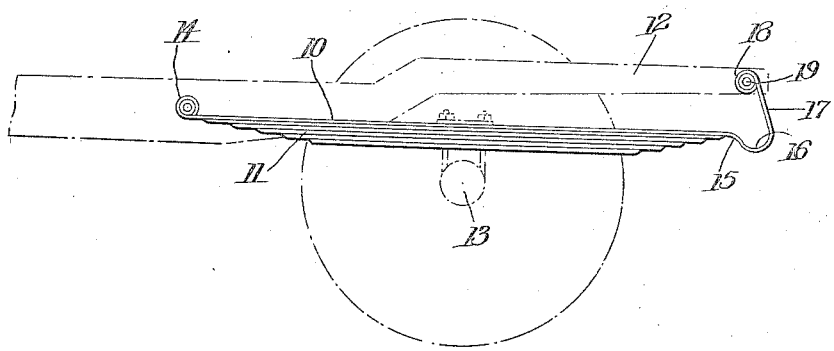
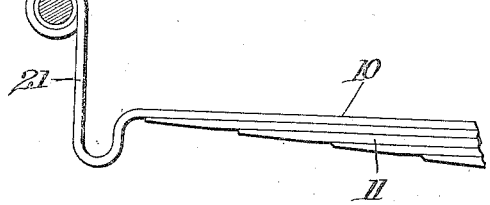
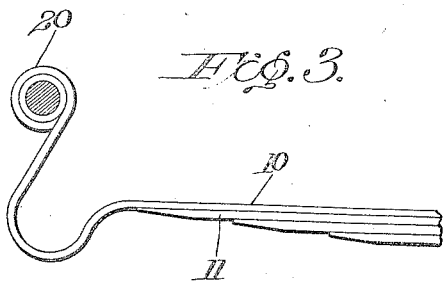
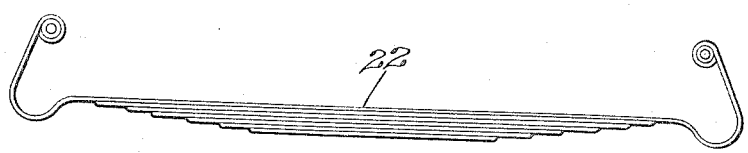
Witnesses
G. T. Baker
H. P. Jennings
Inventor
Arthur M. Laycock
by Foster, Freeman, Watson & Coit
Attorneys

UNITED STATES PATENT OFFICE.

ARTHUR M. LAYCOCK, OF KINGSTON, PENNSYLVANIA.

AUTOMOBILE-SPRING.

1,182,181.

Specification of Letters Patent.  Patented May 9, 1916.

Application filed January 20, 1916. Serial No. 73,162.

*To all whom it may concern:*

Be it known that I, ARTHUR M. LAYCOCK, subject of the King of Great Britain, and resident of Kingston, Luzerne county, State of Pennsylvania, United States of America, have invented certain new and useful Improvements in Automobile-Springs, of which the following is a specification.

This invention relates to vehicle springs and has for its objects the provision of a spring which may be used in connection with a driving axle to transmit the thrusts between the axle and the body and which is so formed as to eliminate the usual shackles which are provided to connect one end of a spring with the body.

Other objects and the features of novelty will be apparent from the following description taken in connection with the accompanying drawings, in which:—

Figure 1 illustrates a spring embodying my invention and shown in connection with the frame and axle of a vehicle. Figs. 2 and 3 are side elevations illustrating modifications of the end construction of the master leaf. Fig. 4 is a side elevation of another form of spring embodying the invention.

Referring to Fig. 1 it will be observed that the spring is composed of a master leaf 10 and one or more reinforcing leaves 11. The frame of the vehicle is indicated at 12 and a driving axle at 13, the axle being connected with the middle portion of the spring in the usual manner. When the spring transmits the thrusts between the driving axle and the body and thus serves the purpose of the radius rods commonly used, it is customary to so make the spring that it is substantially flat, as illustrated, when loaded. In a spring for the purpose described, it is also preferable to form an eye at one end of the master leaf 10 as indicated at 14, this eye being pivotally connected with the vehicle frame. It has been the practice heretofore to connect the other end of the spring with the vehicle frame by means of shackles which permit the end of the spring to move relatively to the frame, longitudinally of the spring. In order to eliminate such shackles and the well known disadvantages which they possess I form the master leaf with a bend 15 toward the reinforcing leaves 11 and adjacent the end of the leaf 11 which adjoins the master leaf. The master leaf is provided with a reverse bend 16 and a substantially straight portion 17 beyond the bends 15 and 16 and extending on the opposite side of the master leaf from the reinforcing leaves 11. The end of the straight portion 17 is provided with an eye 18 which is adapted to receive a pivot 19 on the frame 12. From Fig. 1 it will be apparent that the straight portion 17 of the master leaf will swing to and fro as the spring flexes in a vertical direction, the bends 15 and 16 and the straight portion 17 providing the necessary flexible connection between the spring and the frame 12 and at the same time permitting the thrusts to be transmitted to the frame through the eye 14.

In Figs. 2 and 3 the ends of the master leaf 10 are formed slightly different than illustrated in Fig. 1. In the latter construction the eye 18 is formed by bending the end of the spring inwardly or toward the eye 14, whereas in Fig. 3 the eye 20 is formed by bending the leaf in the opposite direction. It will be evident, however, that both constructions are otherwise substantially alike. In the form shown in Figs. 1 and 3 the straight portion 17 is inclined relatively to the plane of the master leaf whereas in Fig. 2 the straight portion 21 is arranged substantially at right angles to the plane of the master leaf, the arrangement being otherwise like that illustrated in Fig. 3.

In Fig. 4 there is illustrated a spring in which the master leaf 22 has both of its ends formed so as to provide a flexible connection with the vehicle frame. The leaf 22 is illustrated as having the ends formed as in Fig. 1 but it will be evident that the forms shown in Figs. 2 and 3 may also be employed.

Having thus described the invention what is claimed and desired to be secured by Letters Patent is:

1. A leaf spring for vehicles, comprising a master leaf and reinforcing leaves on one side of the master leaf, the master leaf having an eye at one end and having its other end bent, adjacent the end of the adjoining reinforcing leaf, toward the reinforcing leaves and then reversed so as to extend on the opposite side of the master leaf from the reinforcing leaves and having a substantially straight portion beyond said bends and an eye at the end of said straight portion.

2. In a leaf spring for vehicles comprising a master leaf and reinforcing leaves on one side of the master leaf, the master leaf having its ends bent, adjacent the ends of the adjoining reinforcing leaf, toward the reinforcing leaves and then reversed so as to extend on the opposite side of the master leaf from the reinforcing leaves and having substantially straight portions beyond said bends and eyes at the ends of said straight portions.

In testimony whereof I affix my signature.

ARTHUR M. LAYCOCK.